United States Patent
Ball

[11] Patent Number: 6,108,970
[45] Date of Patent: Aug. 29, 2000

[54] SELF-WATERING PLANT GUARD

[76] Inventor: Christopher John Ball, 43 Hill Street, Tamworth, NSW 2340, Australia

[21] Appl. No.: 09/380,995
[22] PCT Filed: Oct. 17, 1997
[86] PCT No.: PCT/AU97/00700
  § 371 Date: Sep. 13, 1999
  § 102(e) Date: Sep. 13, 1999
[87] PCT Pub. No.: WO98/39961
  PCT Pub. Date: Sep. 17, 1998

[30] Foreign Application Priority Data

Mar. 13, 1997 [AU] Australia ................................. PO 5611
Mar. 24, 1997 [AU] Australia ................................. 16497/97

[51] Int. Cl.⁷ .......................... A01G 27/02; A01G 27/06
[52] U.S. Cl. ................................ 47/48.5; 47/79; 47/81
[58] Field of Search ................................ 47/48.5, 23, 25, 47/20, 21, 27, 32.1, 28.1, 65.7, 65.8, 81, 33, 79, 30, 1.01

[56] References Cited

U.S. PATENT DOCUMENTS

| | | | |
|---|---|---|---|
| 179,297 | 6/1876 | Grader | 47/23 |
| 2,909,328 | 10/1959 | Babyak | 239/268 |
| 3,206,892 | 9/1965 | Telkes et al. | 47/29 |
| 3,337,418 | 8/1967 | Halacy, Jr. | 202/83 |
| 3,361,359 | 1/1968 | Chapin | 239/145 |
| 3,711,992 | 1/1973 | Martin | 47/48.5 |
| 3,816,959 | 6/1974 | Nalle, Jr. | |
| 4,087,938 | 5/1978 | Koch | 47/48.5 |
| 4,125,963 | 11/1978 | Johnson | |
| 4,267,665 | 5/1981 | Wallace et al. | 47/26 |
| 4,268,992 | 5/1981 | Sharf, Sr. | |
| 4,336,666 | 6/1982 | Caso | 47/48.5 |
| 4,711,051 | 12/1987 | Fujimoto | 47/17 |
| 4,805,324 | 2/1989 | Jenkins et al. | 47/79 |
| 4,821,453 | 4/1989 | Morehead | 47/26 |
| 4,869,018 | 9/1989 | Scales et al. | 47/33 |
| 4,901,472 | 2/1990 | Donohue et al. | 47/2 |
| 4,961,285 | 10/1990 | Jenkins et al. | 47/79 |
| 5,212,905 | 5/1993 | Philoctete | 47/48.5 |
| 5,426,887 | 6/1995 | Spencer et al. | 47/21 |
| 5,613,320 | 3/1997 | Thomasson et al. | 47/32.1 |
| 5,809,689 | 9/1998 | Mathur | 47/23 |

FOREIGN PATENT DOCUMENTS

| | | |
|---|---|---|
| 80433/94 | 6/1995 | Australia . |
| 2576177 | 7/1986 | France ............... 47/48.5 G |
| 3447485 | 7/1986 | Germany . |

Primary Examiner—Michael J. Carone
Assistant Examiner—Son T. Nguyen
Attorney, Agent, or Firm—Alston & Bird LLP

[57] ABSTRACT

A plant guard 10 that may be used to deliver water to a plant adjacent to which the guard is positioned. The plant guard comprises an elongate tubular body 11 which is adapted to contain water, and the interior of the body is divided by vertical seams 18 into upper and lower reservoir compartments 19, 21 and a plurality of vertical reservoirs 22 interconnecting the upper and lower reservoirs. An aperture 12 adjacent the upper edge permits the addition of water, and a water release outlet 14 adjacent the lower edge permits delivery of the water to the plant in a controlled manner.

16 Claims, 3 Drawing Sheets

SELF-WATERING PLANT GUARD

TECHNICAL FIELD

The present invention relates to a guard to surround plants, particularly newly planted plants, which will not only protect the plant from the effects of physical damage but will also protect the plant from desiccation due to lack of water.

BACKGROUND ART

It is well known to provide newly planted plants, including seedling trees and shrubs, with a protective screen during its early formative growing period. Such plant screens are generally constructed to prevent the plant from being physically damaged by wind or other environmental factors such as being eaten by rodents and other animals or being trampled on by stock animals.

Such known plant guards are conventionally of two types. There are those in which the guard extends about only a part of the plant. Typically such guards are v-shaped and held in place by three vertically arranged stakes, one at each end and one at the apex. In such arrangements the apex of the guard is arranged to point into the direction of the expected prevailing wind to deflect the wind from the plant. The other principal type of plant guard are those that substantially completely surround the plant. Such guards may be circular, square or of any other desired cross sectional shape. They will normally a tube of a synthetic plastics material film held in place by three or more stakes driven into the ground inside the tube and spaced apart around the plant.

In the case of either of the known types of tree guard the guard serves only a part of the function of protecting the plant during its early post-planting life. The reason for this is that the plant is susceptible to a number of adverse environmental influences in addition to physical damage. There is desiccation which is a major problem while the plant establishes its root system, there is also the problem of weed competition. The tree guard to the type that completely surrounds the plant will to some extent shade out weed competition and protect the ground closely adjacent to the plant from drying out as rapidly as it otherwise might. None of the known tree guards, however address the fundamental problem of supplying water to the freshly planted plant during the first weeks and months after it is planted.

It is known to provide a water reservoir adjacent to a newly planted plant however such known reservoirs provide no protection against other environmental hazards as have been described above. The provision of water to newly planted trees and shrubs until they become established can be a substantial undertaking and represent a cost that is considerably greater than the initial cost of the plant.

Attempts have been made to conserve water through mulching of newly planted plants however such efforts only address the issue of the rate of water loss and not the application of water to the plant.

The present invention is designed to provide an alternative to known plant guards which are designed to enable plants to be more readily nurtured in the period after they have been planted.

DISCLOSURE OF THE INVENTION

In a first aspect the present invention is directed to a plant guard that may be used to deliver water to a plant adjacent to which the guard is positioned, the plant guard including a hollow tubular body, adapted to contain water, the body having a length, measured between two ends of the body or around its periphery if it is annular, a width, measured between a pair of spaced apart faces, and a height, measured between a lower edge and an upper edge, the height of the body being very much greater than the width of the body and being less than its length: means to permit the addition of water to the body adjacent its upper edge; and means adjacent the lower edge of the body to permit the delivery of water in a controlled manner from the body to a plant surrounded by the guard. the body being so formed that it may be maintained with its lower edge on the ground adjacent a plant and its faces rising substantially vertically from the ground by vertically extending supporting means and wherein the body is adapted to define an open topped growing space for a plant.

The plant guard is preferably formed with a tubular body however it is within the broadest aspect of the invention to form the tubular body with two ends. The width of the plant guard, that is the distance between two spaced apart faces, is preferably much less than its height, that is the distance between the lower edge of those faces and the upper edges thereof. The tubular body is desirably so designed that when supported by suitable supports, such as wooded stakes, it can be maintained with its lower edge on the ground adjacent a plant and its faces rising substantially vertically from the ground. This arrangement will provide maximum protection for the plant from wind and like damage while providing a substantial volume of water that can be controllably released onto the plant.

The tubular body preferably includes a lower annular reservoir compartment at its lower end and a plurality of vertically extending reservoir compartments in fluid communication with the lower annular reservoir compartment. In a still further preferment the tubular body includes an upper annular reservoir compartment that is in fluid communication with the longitudinally extending reservoir compartments. The means to permit the addition of water to the body are preferably provided in the upper annular reservoir compartment.

The means to permit the addition of water to the body may comprise an opening in the upper end of the tubular body, with or without a closure therefor. In its simplest form the plant guard is merely formed of a material in which an opening may be readily formed by a user. Preferably a suitable place in the tubular body in which a user can form an aperture is marked on the plant guard. In this embodiment of the plant guard a user can erect the plant guard about a plant to be protected, a hole formed in the tubular body at the point marked on the tubular body and the body filled with water through the hole. The water can then discharge through the means adjacent the lower end of the body to deliver water to the plant as will be described in more detail later in this specification.

The tubular body of the plant guard may be formed of a sheet of a synthetic plastics material. Preferably the synthetic plastics material is thermoplastic so that the body may be formed from the sheet by heat welding. Alternatively suitable adhesives may be used to form the sheet into the tubular body. A particularly suitable plastics material from which to form the tubular body is polyethylene however other suitable synthetic plastics materials could be used with equal efficacy. Other suitable materials from which the tubular body could be formed include water-proof cloths and papers, flexible metal sheets and other similar materials.

The plant guard is provided with means to allow water in the tubular body to be released in a controlled fashion. Normally these means will be such as to deliver water to the plant at a rate that is reasonably associated with the plants capacity to use water. Typically the tubular body will be provided with means that allow the water to drip or otherwise leave the body at a very slow rate. The device may in some embodiments comprise a kit of parts including the tubular body and water discharge means so that a user can assemble the water discharge means with the tubular body at the time of use. In a particularly preferred embodiment of the present invention the water discharge means comprises an elongate tube of a synthetic plastics material, the tube having a bore of sufficiently small diameter that the flow of water through the tube is very slow. Such a tube may be assembled with the body of the plant guard if it is formed of polyethylene or a similar resilient plastics material film, by merely pushing the tube, end first, through the film. The film will be pierced but will resiliently engage the outside of the tube in a substantially fluid tight manner.

As used in th s specification the word water is used to include any aqueous solution suitable for the application to plants. It would be possible to apply fertiliser, plant growth hormones, insecticides, fungicides, or any other desired water soluble material to the plant from the plant guard according to the present invention.

In use a plant guard according to preferred embodiments of the present invention will be slit adjacent its upper edge to form a water inlet. A capillary drip tube will be pushed through the plastic film of the body of the plant guard. The plant guard will be placed at least partly around the plant to be protected and a suitable number of stakes driven into the ground in such a way that the guard is held in a vertical array adjacent the plant. Water is then introduced into the body of the plant guard and the water allowed to drip slowly into the root zone of the plant. Typically the plant will have been newly planted although the plant guard according to the present invention may also be used to protect older established plants that are not thriving.

BRIEF DESCRIPTION OF DRAWINGS

The following description of a preferred embodiment of the present invention is provided as an example of the invention and is described with reference to the accompanying drawings in which:—

BEST MODE FOR CARRYING OUT THE INVENTION

Figure 1:
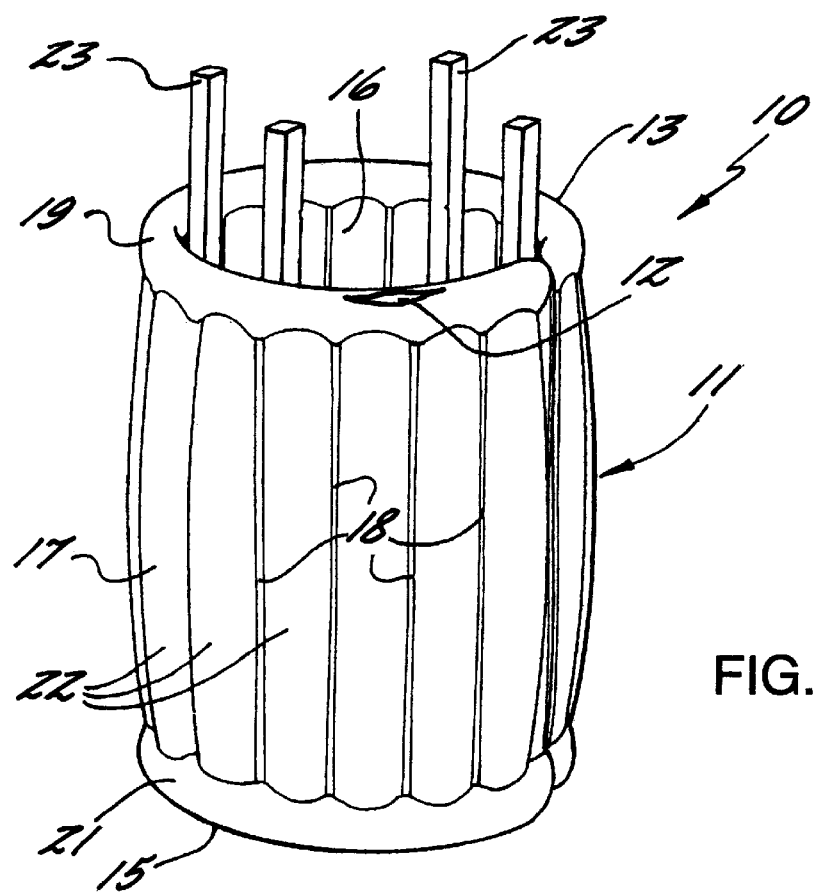
FIG. 1 is a perspective view of a plant guard according to a first embodiment of the present invention held in an erected position by wooden stakes.
Figure 2:
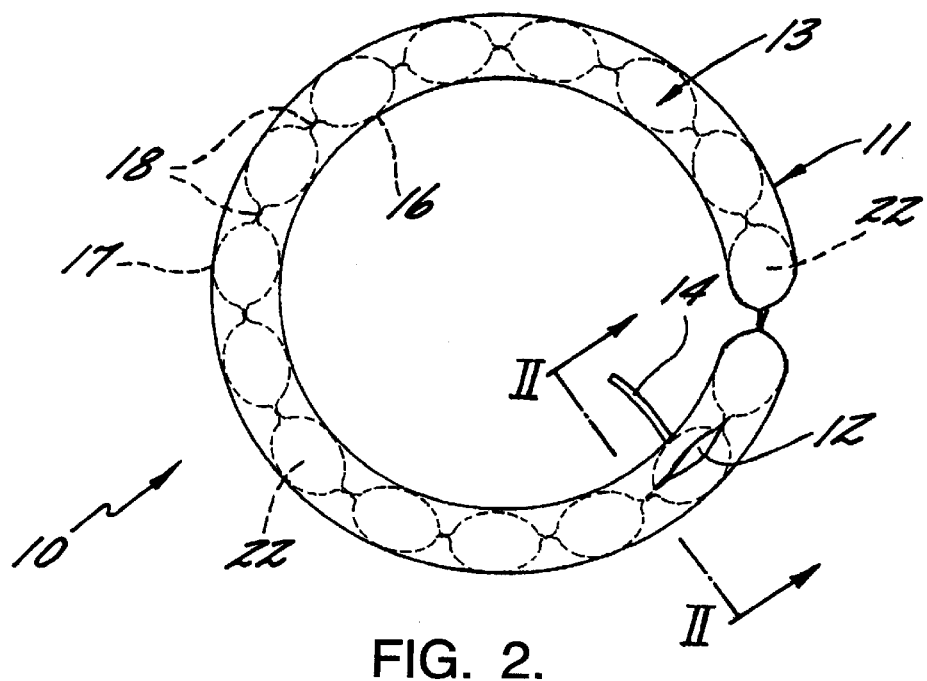
FIG. 2 is a plan view of the plant guard according to FIG. 1.
Figure 3:
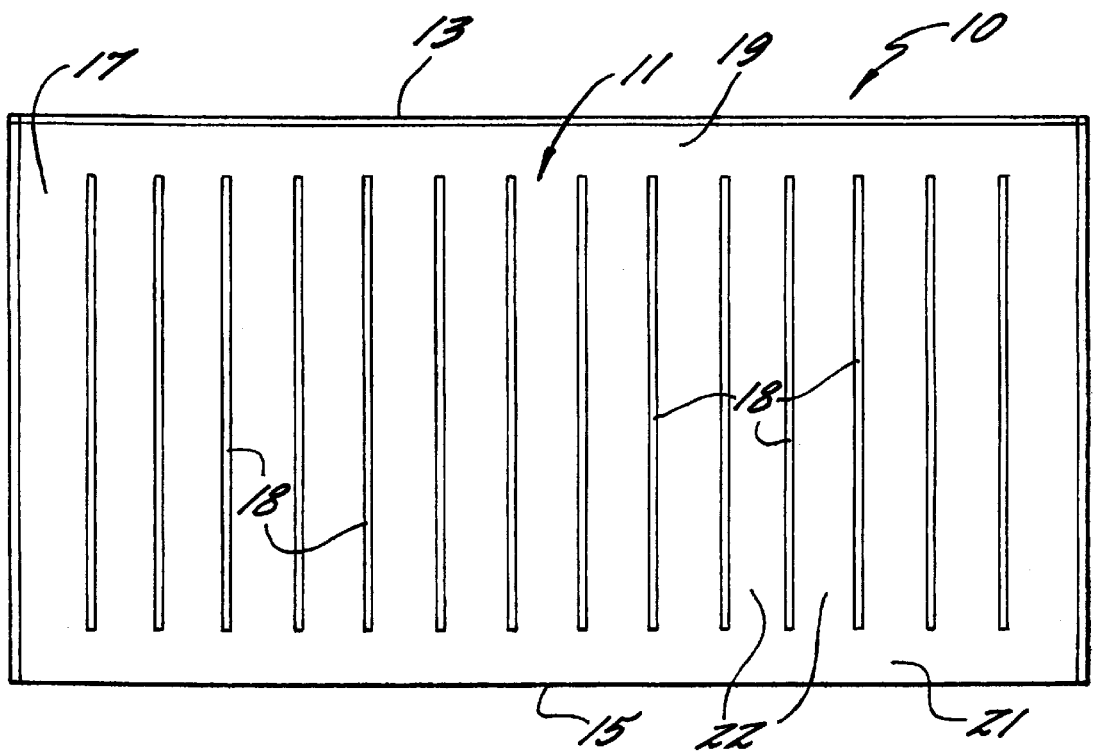
FIG. 3 is a side elevational view of the plant guard of FIG. 1 rolled out flat.
Figure 4:
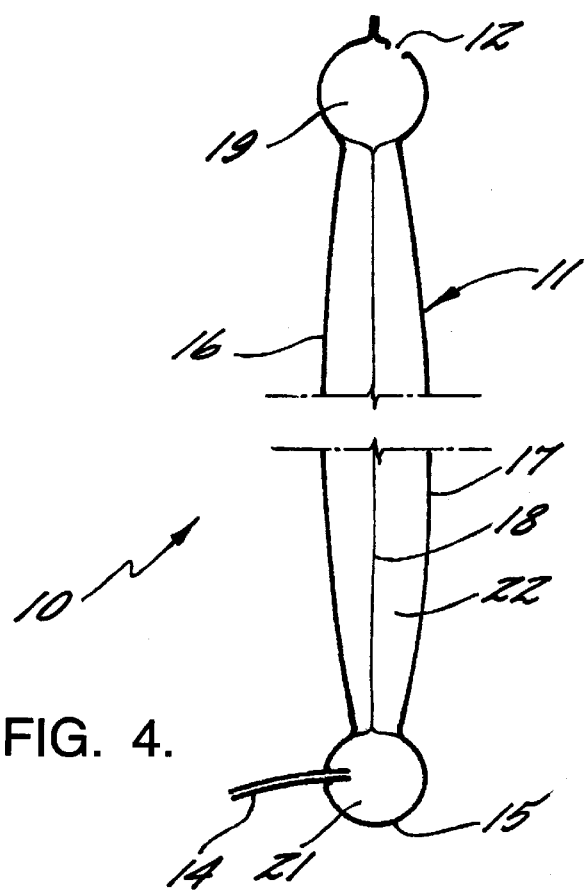
FIG. 4 is a vertical sectional view along line II—II of FIG. 2.

The plant guard 10 shown in FIG. 1 comprises a cylindrical tubular body 11 that is adapted to be provided with an aperture 12 at its upper edge 13 and with a water discharge tube 14 connected adjacent to its lower edge 15. The tubular body 11 is formed of a single sheet of a polyethylene material folded over to form the lower edge 15 and heat sealed to form the top edge 13. The sheet also forms an inside wall 16 and an outside wall 17. The sheet is also formed with a number of vertically arranged seams 18 that are spaced apart around the circumference of the body 11. Each of the seams 18 stops short of both the upper edge 13 and of the lower edge 15.

The seams 18 divide the body 11 into an upper reservoir 19 adjacent the upper edge 13, a lower reservoir 21 adjacent the lower edge 15, and a number of vertically extending reservoirs 22. These reservoirs are all in communication with one another. The upper edge of the body 11 is marked with a line at the site that the aperture is to be formed, a user then uses a knife or scissors to cut along the line to form the aperture 12. Once formed water may be poured through the aperture 12 into the upper reservoir 19 from where it will flow down the vertical reservoirs 22 into the lower reservoir 21. In this way all of the reservoirs may be filled.

The water discharge tube 14 is formed of an elongate length of a synthetic plastics tube with a lumen of capillary dimensions. The tube 14 is supplied to a user separately from the body 11 and the user pushes an end of the tube 14 through the inside wall 16 just above the lower edge 15 into the lower reservoir 21. The polyethylene sheet from which the body is formed has sufficient elasticity that after the tube 14 has been pushed through it will seal back around the tube 14.

In use a user will place the plant guard 10 about a newly planted plant after slitting the body 11 to form the aperture 12 and pushing the tube 14 through the inside wall 16. Three or four stakes 23 can then be driven into the ground within the body 11 to hold it in an upright position. The body 11 can then be filled with water through the aperture and water will drip slowly from the tube 14. The height of the body 11 is such that the plant guard will protect the plant from environmental damage such as wind damage, in addition the plant will be watered by water dripping from the tube 14. The rate of dripping can be controlled by the selection of an appropriate diameter for the lumen of the tube, or, to a lesser extent, by the length of the tube.

The volume and drip rate of the plant guard 10 may be adjusted over wide limits to give the desired watering period from each refill of the body 11 of the plant guard 10 with water. It is quite possible, for instance, to structure the plant guard 10 such that it will drip continuously for in excess of two weeks. It may then be refilled and will again water the plant for another two weeks. It is thus possible for an arborist to plant a large number of trees or shrubs and save a very substantial amount of time filling the plant guards 10 with water only once each fortnight rather than watering the plants individually each day.

Figure 5:
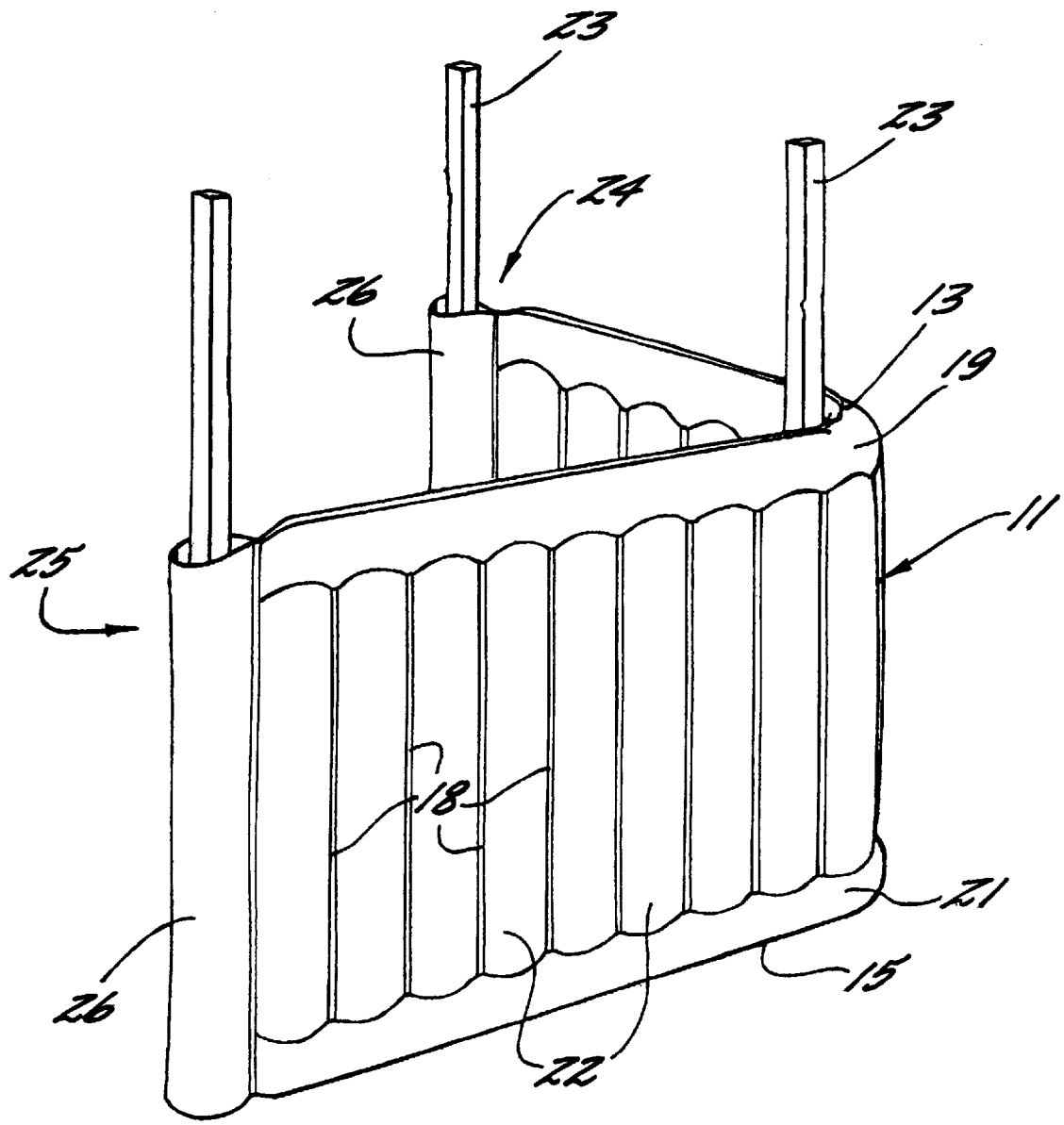
FIG. 5 is a perspective view of a second embodiment of the present invention.

The plant guard 10 of FIG. 5 is similar to that of FIGS. 1 to 4 except that the body 11 is elongate rather than annular. The same numbering is used in respect of this drawing as was used in respect of the earlier described embodiment of the invention. The body 11 has two ends 24 and 25, each of these ends is provided with a loop 26 of the film material of which the body is formed. In use a stake may be driven through each of the loops 26 to hold the body 11 in place in an erect condition.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A plant guard that may be used to deliver water to a plant adjacent to which the guard is positioned, the plant guard comprising:

a hollow tubular body adapted to contain water, said body having a length measured between two ends of said body, a width measured between a pair of spaced apart walls, and a height measured in a vertical direction between a lower edge and an upper edge, the height of said body being very much greater than the width of said body and being less than the length of said body, said body including a lower reservoir compartment at said lower edge and a plurality of vertically extending reservoir compartments in fluid communication with the lower reservoir compartment;

means to permit the addition of water to the body adjacent said upper edge; and means adjacent said lower edge of the body to permit the delivery of water in a controlled manner from said lower reservoir compartment to a plant surrounded by the guard, wherein said body is formed so that it may be maintained with said lower edge on the ground adjacent a plant and said walls rise substantially vertically from the ground by vertically extending supporting means and define an open topped growing space for a plant.

2. A plant guard as claimed in claim 1 in which said body includes an upper reservoir compartment that is in fluid communication with said vertically extending reservoir compartments.

3. A plant guard as claimed in claim 2 wherein both said lower and upper reservoir compartments extend along substantially the entire length of said body.

4. A plant guard as claimed in claim 3 wherein said body includes a plurality of vertically arranged seams wherein said walls are joined together, with said seams being spaced apart in length direction and stopping short of said upper edge and said lower edge and so as to define said vertically extending reservoir compartments and said upper and lower reservoir compartments.

5. A plant guard as claimed in claim 2 in which said body of the plant guard is annular, said length constitutes the circumference of the annular body and said upper compartment is annular.

6. A plant guard as claimed in claim 1 in which the body of the plant guard is annular and said length constitutes the circumference of the annular body.

7. A plant guard as claimed in claim 6 in which said lower reservoir compartment in annular.

8. A plant guard as claimed in claim 1 in which said two ends of said body are each provided with means to connect said end to vertically extending supporting means.

9. A plant guard as claimed in claim 1 in which the means to permit the addition of water of the body comprises a marked position at which a user of the plant guard may form an opening in the wall adjacent the upper edge of the body through which water may be added to the body.

10. A plant guard as claimed in claim 1 in which said body of the plant guard is formed of a sheet of a synthetic plastics material.

11. A plant guard as claimed in claim 10 in which said synthetic plastics material is thermoplastic so that said body may be formed from the sheet by heat welding.

12. A plant guard as claimed in claim 1 in which said water delivery means is selected from a group consisting of a dripper, a wick, and a capillary tube.

13. A plant guard as claimed in claim 12 in which said water delivery means comprises an elongate capillary tube that a user of the plant guard can push through the wall of said body.

14. A plant guard that may be used to deliver water to a plant adjacent to which the guard is positioned, the plant guard comprising:

a hollow tubular body adapted to contain water, said body having a length measured between two ends of said body, a width measured between a pair of spaced apart walls, and a height measured in a vertical direction between a lower edge and an upper edge, the height of said body being very much greater than the width of said body and being less than the length of said body;

means to permit the addition of water to the body adjacent said upper edge; and means adjacent said lower edge of the body to permit the delivery of water in a controlled manner from said tubular body to a plant surrounded by the guard, said water delivery means comprising an elongate length of capillary tube that a user of the plant guard can push through said wall of said body, wherein said body is formed so that it may be maintained with said lower edge on the ground adjacent a plant and said walls rise substantially vertically from the ground by vertically extending supporting means and define an open topped growing space for a plant.

15. A self-watering plant guard including a hollow tubular body of synthetic plastic material which is in the form of an annulus having a circular or rectangular cross-section and adapted to hold water, the body having an upper edge and a lower edge which is adapted to rest on the ground surrounding the plant, means to permit the addition of water to the body at or adjacent its upper edge and means at or adjacent the lower edge of the body to deliver water in a controlled manner to a plant surrounded by the guard, wherein the body includes an inner wall and an outer wall joined together at the upper edge and the lower edge of the body and wherein further the inner and outer walls of the body define a lower annular reservoir compartment at said lower edge and a plurality of vertically extending reservoir compartments in fluid communication with the lower reservoir compartment.

16. A self-watering plant guard as claimed in claim 15 in which said body includes an upper annular reservoir compartment that is in fluid communication with said vertically extending reservoir compartments.

\* \* \* \* \*